Patented Aug. 3, 1954

2,685,586

UNITED STATES PATENT OFFICE 2,685,586

PROCESS FOR SEPARATING β-PYRIDYL NITRILE AND NICOTINAMIDE FROM AN AQUEOUS MIXTURE CONTAINING NICOTINIC ACID

Roland G. Benner, Bronxville, and Irving Hochhauser, Bronx, N. Y., assignors to Nepera Chemical Co., Inc., Yonkers, N. Y., a corporation of New York No Drawing. Application March 13, 1952, Serial No. 276,444

9 Claims. (Cl. 260—295.9)

This invention relates to the separation of certain pyridine compounds and relates more particularly to the separation of nicotinic acid from a mixture containing nicotinic acid, β-pyridyl nitrile and nicotinamide.

An object of this invention is the provision of an efficient and economical process for the treatment of a crude mixture of nicotinamide and β-pyridyl nitrile which also contains nicotinic acid whereby the nicotinamide and β-pyridyl nitrile may be separated from the nicotinic acid.

Other objects of this invention will appear from the following detailed description.

In the production of nicotinamide by a process which involves the amidation of nicotinic acid with ammonia, the crude product of the amidation reaction is obtained in a form which is exceedingly difficult to separate. One suggested procedure for purifying the nicotinamide comprises reacting the crude nicotinamide with a suitable deyhdration catalyst, such as diammonium phosphate, for example, so as to split off water, distilling the resulting β-pyridyl nitrile formed from the dehydration reaction mixture and then hydrolyzing the nitrile back to the amide form. This purification process is a substantially satisfactory one. However, the distillate obtained during the catalytic dehydration step contains, in addition to the desired β-pyridyl nitrile, some nicotinic acid, some unreacted nicotinamide and also, an appreciable amount of the water of reaction. An effective separation of the nicotinic acid from this aqueous mixture is important since it remains unchanged when the purified nitrile undergoes hydrolysis to the amide and constitutes an undesirable impurity in the final product. However, purification of this mixture has proven to be a troublesome operation and a considerable amount of effort has been expended in reaching a satisfactory solution.

We have now found that the nicotinic acid present in a crude aqueous mixture comprising nicotinic acid, β-pyridyl nitrile and nicotinamide may be satisfactorily separated therefrom if the crude aqueous mixture, while in an alkaline condition, is extracted with a water-immiscible hydrocarbon aromatic organic solvent such as, for example, benzene, the xylenes or toluene, employing the solvent in such amount that the concentration of the β-pyridyl nitrile in the solvent is at least 30% by weight. The nicotinic acid remains behind in the raffinate or aqueous phase while both the nicotinamide and β-pyridyl nitrile are removed in the solvent phase. Although nicotinamide is soluble to the extent of less than 1% in said water-immiscible solvents, the solvent solution of β-pyridyl nitrile formed during the extraction operation acts as a very satisfactory solvent for the relatively small amount of nicotinamide present. The most advantageous results are obtained if the solvent solution of β-pyridyl nitrile formed contains from 50 to 60% by weight of the β-pyridyl nitrile.

While our novel extraction process may be carried out as a single stage extraction process, a more complete separation is achieved if said extraction is carried out in a plurality of stages, e. g. two or more, with the raffinate of each stage being subjected to further extraction during subsequent extraction stages. The extraction process may be conducted at all temperatures between the freezing point and boiling point of the constituents, but the preferred range is 25 to 50° C. Ordinarily, sufficient ammonia distills over with the crude product during the catalytic dehydration of the nicotinamide and no further addition of any alkaline agent is necessary to maintain the crude aqueous distillate in an alkaline condition for said extraction treatment. However, where the distillate is not alkaline, it may be made alkaline by the addition thereto of ammonia or caustic soda or any other soluble alkali.

In order further to illustrate the novel process of our invention, but without being limited thereto, the following example is given:

Example 100 parts by weight of a crude alkaline aqueous dehydration product, having a pH of above 7.0 obtained as the distillate of the catalytic dehydration of nicotinamide and consisting of 20 parts by weight of water and 80 parts by weight of a mixture of nicotinic acid, nicotinamide and β-pyridyl nitrile, the ratio of the latter mixture being about 5% by weight of nicotinic acid, 15% by weight of nicotinamide and 80% by weight of β-pyridyl nitrile, are mixed with 40 parts by weight of industrial grade xylene and strongly agitated for 10 minutes at a temperature of about 35° C. The mixture is permitted to separate to form a xylene solution containing 50% by weight of β-pyridyl nitrile in which is dissolved 10% by weight of nicotinamide. The raffinate is allowed to separate and the extraction repeated twice more with 40 parts by weight of xylene being employed for each of said extraction steps. The xylene phases are combined and are found to contain over 98% of the β-pyridyl nitrile and over 60% of the nicotinamide originally present in the crude mixture. The aqueous phase contains all of the nicotinic acid present in the crude mixture as well as some nicotinamide. The aqueous phase is preferably recycled to the amidation step of the process where the nicotinic acid present is converted to crude nicotinamide which is then converted to β-pyridyl nitrile. The xylene phase is treated with water and caustic soda in order to convert the nitrile to purified nicotinamide. Thus, the nicotinamide formed from the nitrile and the nicotinamide which is extracted by the xylene are obtained in the form of a solution from which both can be crystallized out as U. S. P. nicotinamide. Our novel process enables nicotinamide to be obtained in a very high degree of purity and completely acceptable for all commercial uses.

It is to be understood that the foregoing detailed description is given merely by way of illustration and that many variations may be made therein without departing from the spirit of our invention.

Having described our invention, what we desire to secure by Letters Patent is:

We claim:

1. In a process for separating β-pyridyl nitrile and nicotinamide from an aqueous mixture of said compounds containing nicotinic acid as an impurity, the step which comprises extracting the β-pyridyl nitrile and nicotinamide from said aqueous mixture while the latter is in an alkaline condition employing a water-immiscible aromatic organic solvent selected from the group consisting of benzene, toluene, and the xylenes in such amount as to form an organic solvent solution of β-pyridyl nitrile in which nicotinamide is soluble and containing at least 30% by weight of β-pyridyl nitrile.

2. In a process for separating β-pyridyl nitrile and nicotinamide from an aqueous mixture of said compounds containing nicotinic acid as an impurity, the step which comprises extracting the β-pyridyl nitrile and nicotinamide from said aqueous mixture while the latter is in an alkaline condition employing a water-immiscible aromatic organic solvent selected from the group consisting of benzene, toluene, and the xylenes in such amount as to form an organic solvent solution of β-pyridyl nitrile in which nicotinamide is soluble and containing from 50 to 60% by weight of β-pyridyl nitrile.

3. In a process for separating β-pyridyl nitrile and nicotinamide from an aqueous mixture of said compounds containing nicotinic acid as an impurity, the step which comprises extracting the β-pyridyl nitrile and nicotinamide from said aqueous mixture while the latter is in an alkaline condition employing benzene as the extractant, the benzene being employed in such amount as to form a benzene solution of β-pyridyl nitrile in which nicotinamide is soluble and containing from 50 to 60% by weight of β-pyridyl nitrile.

4. In a process for separating β-pyridyl nitrile and nicotinamide from an aqueous mixture of said compounds containing nicotinic acid as an impurity, the step which comprises extracting the β-pyridyl nitrile and nicotinamide from said aqueous mixture while the latter is in an alkaline condition employing toluene as the extractant, the toluene being employed in such amount as to form a toluene solution of β-pyridyl nitrile in which nicotinamide is soluble and containing from 50 to 60% by weight of β-pyridyl nitrile.

5. In a process for separating β-pyridyl nitrile and nicotinamide from an aqueous mixture of said compounds containing nicotinic acid as an impurity, the step which comprises extracting the β-pyridyl nitrile and nicotinamide from said aqueous mixture while the latter is in an alkaline condition employing xylene as the extractant, the xylene being employed in such amount as to form a xylene solution of β-pyridyl nitrile in which nicotinamide is soluble and containing from 50 to 60% by weight of β-pyridyl nitrile.

6. In a process for separating β-pyridyl nitrile and nicotinamide from an aqueous mixture of said compounds containing nicotinic acid as an impurity, the step which comprises subjecting said aqueous mixture to a plurality of extractions to remove the β-pyridyl nitrile and nicotinamide therefrom while said aqueous mixture is in an alkaline condition employing a water-immiscible aromatic organic solvent selected from the group consisting of benzene, toluene, and the xylenes, the amount of said solvent which is employed in each stage being such as to form an organic solvent solution of β-pyridyl nitrile in which nicotinamide is soluble and containing at least 30% by weight of β-pyridyl nitrile.

7. In a process for separating β-pyridyl nitrile and nicotinamide from an aqueous mixture of said compounds containing nicotinic acid as an impurity, the step which comprises subjecting said aqueous mixture to a plurality of extractions to remove the β-pyridyl nitrile and nicotinamide therefrom while said aqueous mixture is in an alkaline condition employing benzene as the extractant, the benzene being employed in such amount in each stage as to form a benzene solution of β-pyridyl nitrile in which nicotinamide is soluble and containing from 50 to 60% by weight of β-pyridyl nitrile.

8. In a process for separating β-pyridyl nitrile and nicotinamide from an aqueous mixture of said compounds containing nicotinic acid as an impurity, the step which comprises subjecting said aqueous mixture to a plurality of extractions to remove the β-pyridyl nitrile and nicotinamide therefrom while said aqueous mixture is in an alkaline condition employing toluene as the extractant, the toluene being employed in such amount in each stage as to form a toluene solution of β-pyridyl nitrile in which nicotinamide is soluble and containing from 50 to 60% by weight of β-pyridyl nitrile.

9. In a process for separating β-pyridyl nitrile and nicotinamide from an aqueous mixture of said compounds containing nicotinic acid as an impurity, the step which comprises subjecting said aqueous mixture to a plurality of extractions to remove the β-pyridyl nitrile and nicotinamide therefrom while said aqueous mixture is in an alkaline condition employing xylene as the extractant, the xylene being employed in such amount in each stage as to form a xylene solution of β-pyridyl nitrile in which nicotinamide is soluble and containing from 50 to 60% by weight of β-pyridyl nitrile.

References Cited in the file of this patent

UNITED STATES PATENTS

| Number | Name | Date |
| --- | --- | --- |
| 2,436,660 | Mueller | Feb. 24, 1948 |
| 2,471,518 | Duesel et al. | May 31, 1949 |
| 2,491,253 | Crossley et al. | Dec. 13, 1949 |
| 2,496,114 | Berg | Jan. 31, 1950 |